(12) United States Patent
Boehler et al.

(10) Patent No.: US 11,238,167 B2
(45) Date of Patent: Feb. 1, 2022

(54) SECURE SUBLINEAR TIME DIFFERENTIALLY PRIVATE MEDIAN COMPUTATION

(71) Applicant: SAP SE, Walldorf (DE)

(72) Inventors: Jonas Boehler, Karlsruhe (DE); Florian Kerschbaum, Waterloo (CA)

(73) Assignee: SAP SE, Walldorf (DE)

( * ) Notice: Subject to any disclaimer, the term of this patent is extended or adjusted under 35 U.S.C. 154(b) by 354 days.

(21) Appl. No.: 16/442,212

(22) Filed: Jun. 14, 2019

(65) Prior Publication Data

US 2020/0394316 A1 Dec. 17, 2020

(51) Int. Cl.
*G06F 21/60* (2013.01)
*H04L 9/08* (2006.01)

(52) U.S. Cl.
CPC ............ *G06F 21/602* (2013.01); *H04L 9/088* (2013.01); *H04L 2209/46* (2013.01)

(58) Field of Classification Search
CPC ...... G06F 21/602; G06F 21/6245; G06F 7/08; G06F 7/06; G06F 7/16; G06F 7/00; H04L 9/088; H04L 2209/46
USPC .......................................... 713/164; 707/748
See application file for complete search history.

(56) References Cited

U.S. PATENT DOCUMENTS

| | | | | |
|---|---|---|---|---|
| 6,519,604 B1 * | 2/2003 | Acharya | ............. | G06F 16/2462 707/738 |
| 10,817,750 B2 * | 10/2020 | Hazard | ................ | G06K 9/6257 |
| 10,970,417 B1 * | 4/2021 | Gulsen | .................... | G06F 7/582 |
| 2008/0040603 A1 * | 2/2008 | Stedron | .................. | H04L 9/088 713/166 |
| 2011/0283099 A1 * | 11/2011 | Nath | ....................... | H04L 9/008 713/150 |

(Continued)

OTHER PUBLICATIONS

Vincent Bindschaedler et al., Achieving Differential Privacy in Secure Multiparty Data Aggregation Protocols on Star Networks, CODASPY'17, Mar. 22-24, 2017, Scottsdale, AZ, USA (Year: 2017).*

(Continued)

*Primary Examiner* — Kambiz Zand
*Assistant Examiner* — Mahabub S Ahmed
(74) *Attorney, Agent, or Firm* — Schwegman Lundberg & Woessner, P.A.

(57) ABSTRACT

Techniques for efficient, accurate, and secure computation of a differentially private median of the union of two large confidential datasets are disclosed. In some example embodiments, a computer-implemented method comprises obtaining secret shares of a first dataset of a first entity, secret shares of a second dataset of a second entity, secret shares of gap values for the first dataset, secret shares of gap values for the second dataset, secret shares of probability mass values for the first dataset, and secret shares of probability mass values for the second dataset. The probability mass values may be computed via an exponential mechanism. In some example embodiments, the computer-implemented method further comprises determining a median of a union of the first dataset and the second dataset using an inverse transform sampling algorithm based on the obtained secret shares, and then performing a function of a networked computer system using the determined median.

20 Claims, 14 Drawing Sheets

(56) References Cited

U.S. PATENT DOCUMENTS

| | | | | |
|---|---|---|---|---|
| 2012/0143922 | A1* | 6/2012 | Rane | G06Q 10/00 707/803 |
| 2013/0085916 | A1* | 4/2013 | Abbe | H04L 9/3218 705/35 |
| 2013/0212690 | A1* | 8/2013 | Fawaz | G06F 21/60 726/26 |
| 2014/0281572 | A1* | 9/2014 | Wang | G06F 21/6254 713/189 |
| 2014/0301450 | A1* | 10/2014 | Alshina | H04N 19/157 375/240.03 |
| 2015/0161398 | A1* | 6/2015 | De Cristofaro | G06F 21/60 726/26 |
| 2015/0220534 | A1* | 8/2015 | Constantine | G06F 16/24578 707/748 |
| 2015/0286827 | A1* | 10/2015 | Fawaz | H04L 9/00 726/26 |
| 2015/0371059 | A1* | 12/2015 | Bilogrevic | G06F 21/6245 726/26 |
| 2015/0372808 | A1* | 12/2015 | Bilogrevic | H04L 9/085 380/279 |
| 2017/0124152 | A1* | 5/2017 | Nerurkar | G06N 20/20 |
| 2017/0169253 | A1* | 6/2017 | Curcio | G06F 21/6254 |
| 2017/0293772 | A1* | 10/2017 | Chen | G06F 21/6254 |
| 2017/0308802 | A1* | 10/2017 | Ramsoy | G06N 20/10 |
| 2017/0316346 | A1* | 11/2017 | Park | G06F 21/6263 |
| 2017/0353855 | A1* | 12/2017 | Joy | H04W 12/02 |
| 2018/0058857 | A1* | 3/2018 | Yost | G01R 33/0064 |
| 2018/0060485 | A1* | 3/2018 | Huang | G16B 30/00 |
| 2018/0101697 | A1* | 4/2018 | Rane | G06F 21/602 |
| 2018/0239925 | A1* | 8/2018 | Nerurkar | G06F 21/6254 |
| 2018/0268283 | A1* | 9/2018 | Gilad-Bachrach | G06N 5/003 |
| 2018/0349384 | A1* | 12/2018 | Nerurkar | G06F 21/6227 |
| 2019/0013950 | A1* | 1/2019 | Becker | H04L 9/3093 |
| 2019/0026489 | A1* | 1/2019 | Nerurkar | G06F 21/6254 |
| 2019/0065775 | A1* | 2/2019 | Klucar, Jr. | G06F 16/2455 |
| 2019/0147188 | A1* | 5/2019 | Benaloh | H04L 9/0897 726/26 |
| 2019/0156057 | A1* | 5/2019 | Nissim Kobliner | G06F 21/6245 |
| 2019/0228184 | A1* | 7/2019 | Sullivan | G06F 16/2457 |
| 2019/0318121 | A1* | 10/2019 | Hockenbrocht | G06F 16/2358 |
| 2019/0332703 | A1* | 10/2019 | Feldman | G06F 16/24578 |
| 2019/0332807 | A1* | 10/2019 | LaFever | H04L 63/0407 |
| 2019/0370334 | A1* | 12/2019 | Bhowmick | G06F 40/232 |
| 2020/0034347 | A1* | 1/2020 | Selly | G06N 10/00 |
| 2020/0074110 | A1* | 3/2020 | Veeningen | G06F 16/901 |
| 2020/0186356 | A1* | 6/2020 | Veeningen | H04L 9/085 |
| 2020/0279045 | A1* | 9/2020 | Tueno | H04L 9/30 |
| 2020/0304293 | A1* | 9/2020 | Gama | G06F 17/16 |
| 2020/0310758 | A1* | 10/2020 | Desoli | G06F 7/5443 |
| 2020/0311300 | A1* | 10/2020 | Callcut | G06F 21/6245 |
| 2020/0327252 | A1* | 10/2020 | McFall | G06F 21/602 |
| 2021/0133587 | A1* | 5/2021 | Mohassel | G06N 20/00 |
| 2021/0144127 | A1* | 5/2021 | Veeningen | H04L 63/062 |
| 2021/0166157 | A1* | 6/2021 | Bhowmick | G06N 20/20 |

OTHER PUBLICATIONS

Pettai et al., Combining Differential Privacy and Secure Multiparty Computation, ACSAC '15, Dec. 7-11, 2015, Los Angeles, CA, USA (Year: 2015).*

Hongde et al., Differential Privacy Data Aggregation Optimizing Method and Application to Data Visualization, 2014 IEEE Workshop on Electronics, Computer and Applications (Year: 2014).*

Rastogi et al., Differentially Private Aggregation of Distributed Time-Series with Transformation and Encryption, SIGMOD'10, Jun. 6-11, 2010, Indianapolis, Indiana, USA. (Year: 2010).*

Fan, et al., Differentially Private Multi-dimensional Time Series Release for Traffic Monitoring; International Federation for Information Processing 2013 (Year: 2013).*

Kairouz et al., Differentially Private Multi-party Computation; 2016 Annual Conference on Information Science and Systems (CISS) (Year: 2016).*

Roth et al., Interactive Privacy via the Median Mechanism, STOC'10, Jun. 5-8, 2010, Cambridge, Massachusetts, USA. (Year: 2010).*

Masters et al., Mathematical Foundations for Distributed Differential Privacy, Master's Thesis in Mathematics at University of Pennsylvania (Year: 2018).*

Inan et al., Private Record Matching Using Differential Privacy, EDBT 2010, Mar. 22-26, 2010, Lausanne, Switzerland. (Year: 2010).*

* cited by examiner

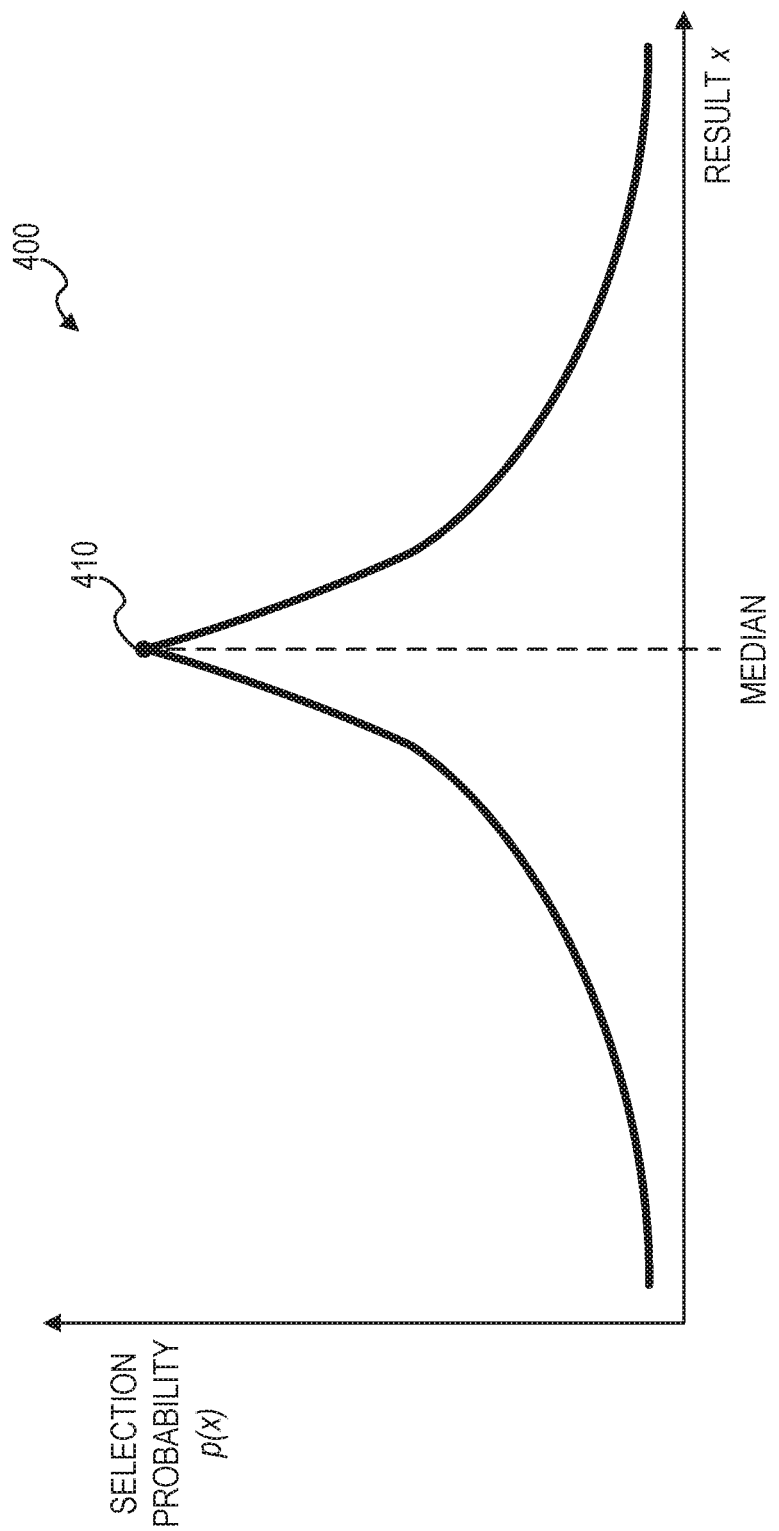

600

---
Algorithm 1 Algorithm PRUNE prunes $D_A, D_B$ to $D_A^s, D_B^s$
---
Input: Data $D_A$ from $A$, $D_B$ from $B$, pruning steps $s$, median rank $k = \lceil (|D_A| + |D_B|)/2 \rceil$.
Output: $A$ has pruned data $D_A^s$, likewise $B$ has $D_B^s$.
1: $\underline{A}$: $D_A^1 \leftarrow \text{PAD}(D_A, k, +\infty)$
2: $\underline{B}$: $D_B^1 \leftarrow \text{PAD}(D_A, k, -\infty)$
3: for $i \leftarrow 1$ to $s$ do
4:     $\underline{A}$: $m_A \leftarrow \text{median}(D_A^i)$
5:     $\underline{B}$: $m_B \leftarrow \text{median}(D_B^i)$
6:     $c \leftarrow m_A < m_B$
7:     $\underline{A}$: $D_A^{i+1} \leftarrow$ upper half of $D_A^i$ if $c = 1$ else lower
8:     $\underline{B}$: $D_B^{i+1} \leftarrow$ lower half of $D_B^i$ if $c = 1$ else upper
9: end for
---

Algorithm 2 Algorithm MERGEANDSHARE merges $D_A^s$, $D_B^s$ into sorted $D^s$

---

Input: Pruned data $D_A^s$ from $A$ in ascending order, array $\langle D^s \rangle_A$ of $2|D_A^s|$ random values in $\mathbb{Z}_{2^{64}}$ from $A$, $D_B^s$ from $B$ sorted in descending order.

Output: $A$ has secret shares $\langle D^s \rangle_A$ of sorted union of pruned data, resp. $B$ has $\langle D^s \rangle_B$.

1: $D^s \leftarrow D_A^s$ appended with $D_B^s$
2: MERGE$(0, |D^s| - 1, D^s)$
3: $\langle D^s \rangle_B \leftarrow D^s - \langle D^s \rangle_A \mod 2^{64}$
4: return $\langle D^s \rangle_B$ to $B$

Algorithm 3 Algorithm SELECTIONPROBABILITY computes the probabilities for the median utility.

---

Input: Secret shares $\langle D^s \rangle_A$ from $A$ resp. $\langle D^s \rangle_B$ from $B$ of the sorted data $D^s$.

Output: $A$ holds secret shares $\langle gap \rangle_A$ of gaps and $\langle mass \rangle_A$ of probability masses, also nonces $N_A^1, N_A^2$; likewise party $B$ has $\langle gap \rangle_B, \langle mass \rangle_B, N_B^1, N_B^2$.

1: $\underline{A}$: $\langle D^s \rangle_A \leftarrow (0, \langle D^s \rangle_A, 0)$
2: $\underline{B}$: $\langle D^s \rangle_B \leftarrow (\min(U), \langle D^s \rangle_B, \max(U))$
3: each party $P \in \{A, B\}$ does
4:     Define arrays $\langle mass \rangle_P, \langle gap \rangle_P$ of size $n \leftarrow |D^s|$
5:     for $i \leftarrow 0$ to $n - 1$ do
6:         $utility \leftarrow \begin{cases} i - \frac{n}{2} + 1 & \text{if } i < \frac{n}{2} \\ \frac{n}{2} - i & \text{else} \end{cases}$
7:         $weight \leftarrow \exp(\epsilon \cdot utility)$
8:         $\langle g_1 \rangle_P \leftarrow \langle D^s[i+1] \rangle_P - \langle D^s[i] \rangle_P$
9:         $\langle g_2 \rangle_P \leftarrow \langle D^s[i] \rangle_P - \langle D^s[i-1] \rangle_P$
10:        $\langle gap[i] \rangle_P \leftarrow \begin{cases} \langle g_1 \rangle_P & \text{if } i < \frac{n}{2} - 1 \\ \langle 1 \rangle_P & \text{if } i = \frac{n}{2} - 1 \\ \langle g_2 \rangle_P & \text{else} \end{cases}$
11:        $m \leftarrow \langle mass[i-1] \rangle_P$ if $i > 0$ else $0$
12:        $\langle mass[i] \rangle_P \leftarrow m + weight \cdot \langle gap[i] \rangle_P$
13:     end for
14:     Draw nonces $N_P^1, N_P^2$ from $[0, \max(U) - \min(U)]$
15: end each

Algorithm 4 Algorithm MEDIANSELECTION selects the median via inverse transform sampling.

---

Input: Secret shares $(gap)_A$ of gaps, $(mass)_A$ of probability masses, and $(D^s)_A$ of $A$'s (pruned) data, also nonces $N_A^1, N_A^2$ from $A$; resp. $(gap)_B, (mass)_B, (D^s)_B, N_B^1, N_B^2$ from $B$.
Output: Differentially private median $\widehat{m}$ of $D_A \cup D_B$.
1: $n \leftarrow |D^s|$
2: $R \leftarrow (mass[n-1])_A + (mass[n-1])_B \mod 2^{64}$
3: $r \leftarrow \text{RANDOMDRAW}(R+1, N_A^1, N_B^1)$  //App. B.3
4: Initialize $j \leftarrow -1$ and define $d, g$
5: for $i \leftarrow 0$ to $n-1$ do
6:    $e \leftarrow (D^s[i])_A + (D^s[i])_B \mod 2^{64}$  //Recombine shares
7:    $gap \leftarrow (gap[i])_A + (gap[i])_B \mod 2^{64}$
8:    $mass \leftarrow (mass[i])_A + (mass[i])_B \mod 2^{64}$
9:    if $r < mass$ and $j = -1$ then
10:      $d \leftarrow e; g \leftarrow gap; j \leftarrow i$
11:    end if
12: end for
13: $x \leftarrow \text{RANDOMDRAW}(g, N_A^2, N_B^2)$
14: $\widehat{m} \leftarrow \begin{cases} d+x & \text{if } j < \frac{n}{2} - 1 \\ d-x & \text{else} \end{cases}$
15: return $\widehat{m}$ to $A, B$

| Index $i$ | 0 | 1 | 2 | - | 3 | 4 | 5 | 6 | - | 7 |
|---|---|---|---|---|---|---|---|---|---|---|
| Sorted $D$ | 1 | 2 | 2 | 3,4,5 | 6 | 6 | 7 | 7 | 8,9 | 10 |
| $rank_D(\cdot)$ | 0 | 1 | 1 | 3 | 3 | 3 | 5 | 5 | 7 | 7 |
| $u_{median}(D, \cdot)$ | -3 | -1 | -1 | -1 | 0 | 0 | -1 | -1 | -3 | -3 |
| $utility(i)$ | -3 | -2 | -1 | -1 | 0 | 0 | -1 | -2 | -3 | -3 |
| $gap(i)$ | 1 | 0 | 4 | - | 1 | 0 | 1 | 0 | - | 3 |

$min(U), max(U)$   Missing elements $U \backslash D$

*FIG. 11*

SECURE SUBLINEAR TIME DIFFERENTIALLY PRIVATE MEDIAN COMPUTATION

TECHNICAL FIELD

The present application relates generally to the technical field of electrical computer systems, and, in various embodiments, to systems and methods for efficient, accurate, and secure computation of a differentially private median of the union of two or more large confidential datasets.

BACKGROUND

In distributed private learning (e.g., data analysis, machine learning, enterprise benchmarking), it is commonplace for two parties or entities with confidential datasets to compute statistics over their combined data. The median is an important robust statistical method used in enterprise benchmarking. The median is used to represent a "typical" value from a dataset and is utilized in enterprise benchmarking, where companies measure their performance against the competition to find opportunities for improvement. Since the data are sensitive (e.g., salary, health information), the entities want to compute the median without revealing any of their data to each other. Although solutions have been developed to reveal the exact median and nothing else, the exact median itself is a value from a private dataset of an entity, and median queries can be used to uncover the exact value of targeted individuals. Therefore, although the exact median can be computed securely, it leaks information about the private data of the corresponding entity from which it was derived. Prior art solutions that use central computation via a trusted server to receive the respective datasets from different entities and to compute the median of the combined datasets are accurate, but they suffer from data security issues as they offer less privacy. On the other hand, prior art solutions that use local computation over the respective datasets on their respective entity computer systems improve data security as they offer more privacy, but they are less accurate in their median predictions. As a result, prior art solutions suffer from technical problems of a lack of accuracy and a lack of data security, thereby diminishing the functioning of the underlying computer system(s).

BRIEF DESCRIPTION OF THE DRAWINGS

Some example embodiments of the present disclosure are illustrated by way of example and not limitation in the figures of the accompanying drawings, in which like reference numbers indicate similar elements.

FIG. 4 illustrates a graph of selection probability values plotted against different values of a dataset, in accordance with some example embodiments.

FIG. 6 illustrates a pruning algorithm, in accordance with some example embodiments.

FIG. 7 illustrates a merge and share algorithm configured to generate secret shares of a sorted union of data, in accordance with some example embodiments.

FIG. 8 illustrates a selection probability algorithm configured to compute secret shares of gap values and secret shares of probability mass values, in accordance with some example embodiments.

FIG. 9 illustrates a median selection algorithm configured to determine a median of a union of two or more datasets using an inverse transform sampling algorithm, in accordance with some example embodiments.

FIG. 11 illustrates a table showing examples of utility values and gap values, in accordance with some example embodiments.

DETAILED DESCRIPTION

Figure 1:
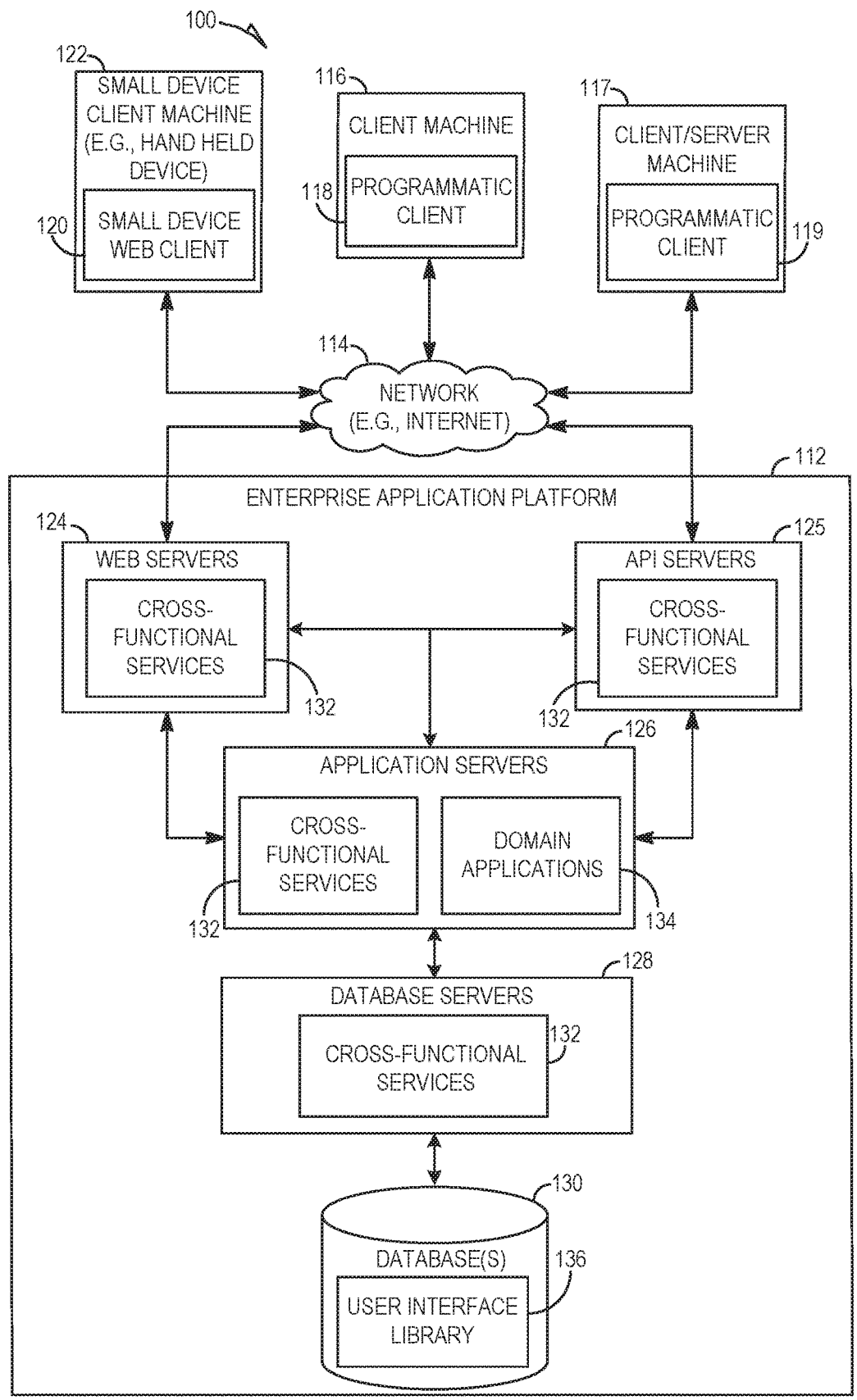
FIG. 1 is a network diagram illustrating a client-server system, in accordance with some example embodiments.

Example methods and systems for efficient, accurate, and secure computation of a differentially private median of the union of two or more large confidential datasets are disclosed. In the following description, for purposes of explanation, numerous specific details are set forth in order to provide a thorough understanding of example embodiments. It will be evident, however, to one skilled in the art that the present embodiments can be practiced without these specific details.

In some example embodiments, a secure computation computer system is configured to securely compute a differentially private median via the exponential mechanism. The exponential mechanism has a runtime linear in the data universe size and efficiently sampling it is non-trivial. Local differential privacy, where each user shares locally perturbed data with an untrusted server, is used in private learning, but does not provide the same utility as the central model, where noise is only applied once by a trusted server. The secure computation system of the present disclosure provides an efficient secure computation of a differentially private median of the union of two large confidential datasets that is accurate and protects the privacy of the datasets. The algorithm executed by the secure computation system of the present disclosure has a runtime sublinear in the size of the data universe and utility like the central model without a trusted third party. The secure computation system of the present disclosure may be implemented using dynamic programming with a static (e.g., data-independent) access pattern, achieving low complexity of the secure computation circuit.

The implementation of the features disclosed herein involves a non-generic, unconventional, and non-routine operation or combination of operations. By applying one or more of the solutions disclosed herein, some technical effects of the system and method of the present disclosure are to improve the accuracy of computations in determining a median of a union of two or more datasets from two or more separate entities, while also improving the data security of the two or more datasets. As a result, the functioning of the computer system is improved. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is a network diagram illustrating a client-server system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are, of course, not limited to such an architecture, and could equally well find application in a distributed, or peer-to-peer, architecture system.

The enterprise application platform 112 can improve (e.g., increase) accessibility of data across different environments of a computer system architecture. For example, the enterprise application platform 112 can effectively and efficiently enable a user to use real data created from use by one or more end users of a deployed instance of a software solution in a production environment when testing an instance of the software solution in the development environment. The enterprise application platform 112 is described in greater detail below in conjunction with FIGS. 2-8.

Figure 2:
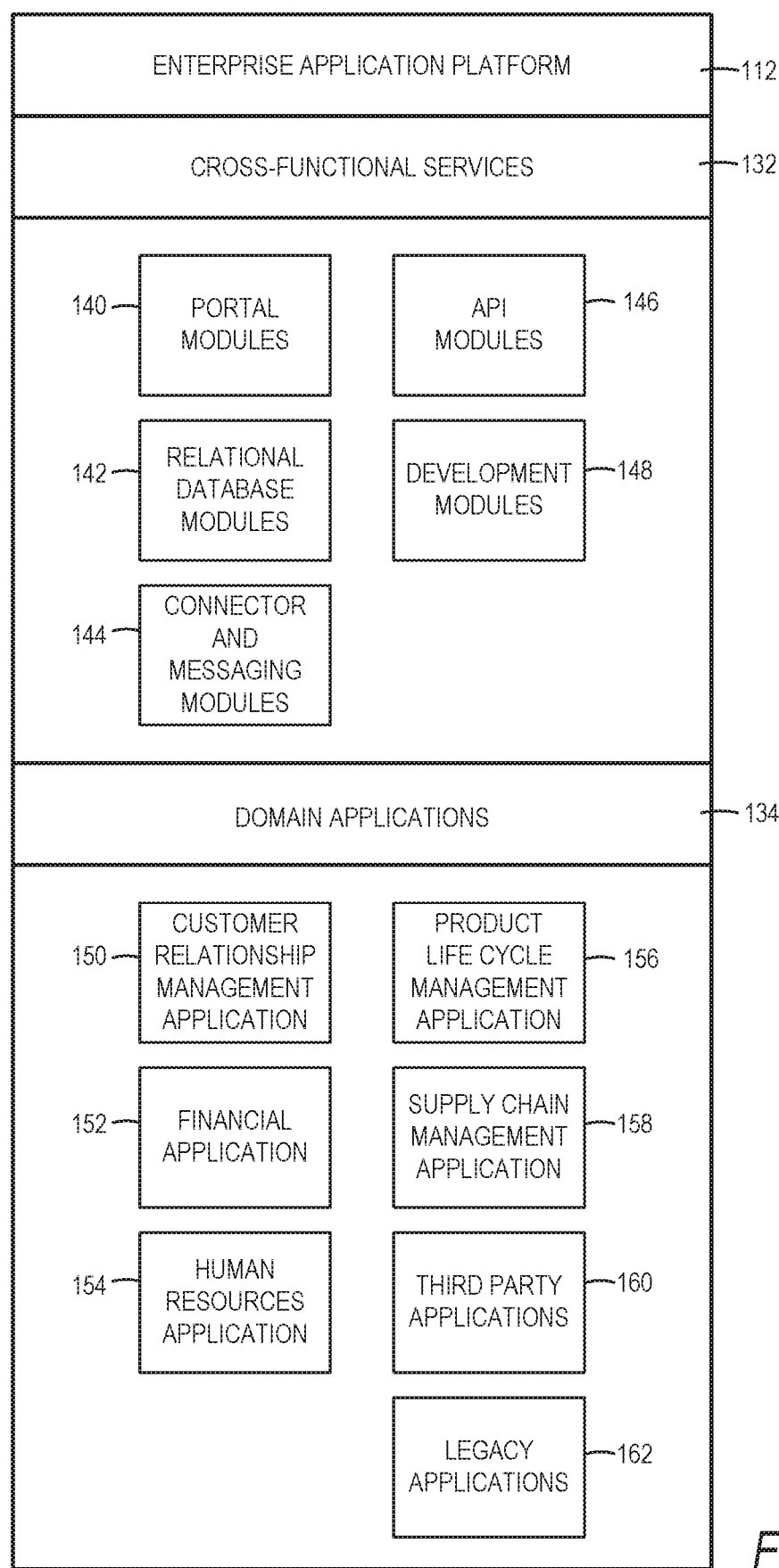
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services, and exchange information with other users within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including JAVA®, J2EE, SAP's Advanced Business Application Programming Language (ABAP®) and Web Dynpro, XML, JCA, JAAS, X.509, LDAP, WSDL, WSRR, SOAP, UDDI and MICROSOFT® .NET®.

The relational database modules 142 can provide support services for access to the database(s) 130, which includes a user interface library 136. The relational database modules 142 can provide support for object relational mapping, database independence, and distributed computing. The relational database modules 142 can be utilized to add, delete, update and manage database elements. In addition, the relational database modules 142 can comply with database standards and/or utilize a variety of database technologies including SQL, SQLDBC, Oracle. MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating, and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical, and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real-time information.

The product life cycle management applications 156 can enable the management of a product throughout the life cycle of the product. For example, the product life cycle management applications 156 can enable collaborative engineering, custom product development, project management, asset management, and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

Figure 3:
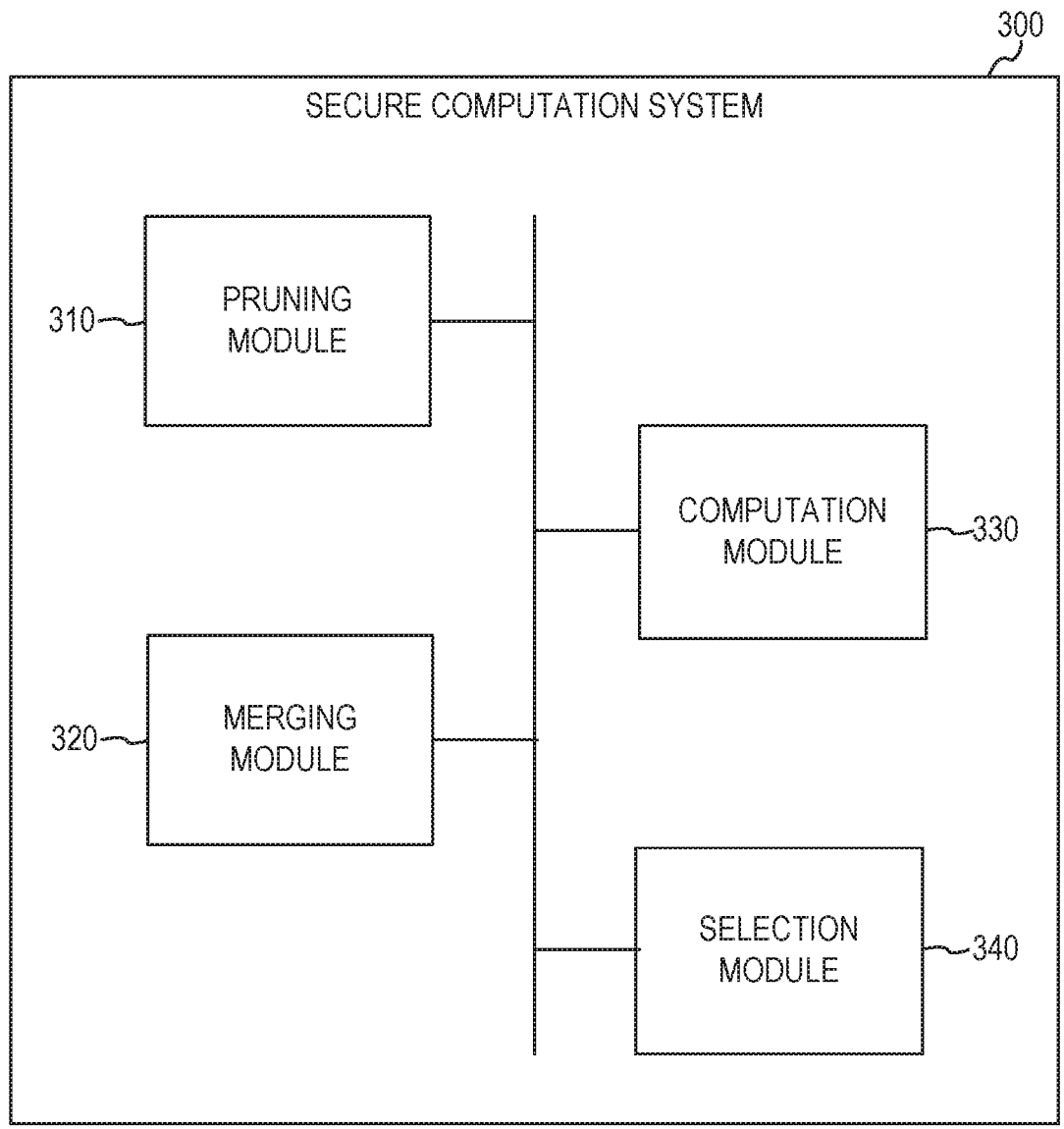
FIG. 3 is a block diagram illustrating a secure computation system, in accordance with some example embodiments.

FIG. 3 is a block diagram illustrating a secure computation system 300, in accordance with some example embodiments. In some embodiments, the secure computation system 300 comprises any combination of one or more of a pruning module 310, a merging module 320, a computation module 330, and a selection module 340. The modules 310, 320, 330, and 340 can reside on a computer system, or other machine, having a memory and at least one processor (not shown). In some embodiments, the modules 310, 320, 330, and 340 can be incorporated into the application server(s) 126 in FIG. 1. However, it is contemplated that other configurations of the modules 310, 320, 330, and 340 are also within the scope of the present disclosure.

In some example embodiments, one or more of the modules 310, 320, 330, and 340 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the modules 310, 320, 330, and 340 is configured to receive user input. For example, one or more of the modules 310, 320, 330, and 340 can present one or more GUI elements (e.g., drop-down menu, selectable buttons, text field) with which a user can submit input. In some example embodiments, one or more of the modules 310, 320, 330, and 340 is configured to perform various communication functions to facilitate the functionality described herein, such as by communicating with the computing device 305 via the network 114 using a wired or wireless connection.

In some example embodiments, the secure computation system 300 is configured to securely compute a differentially private median of a union of two or more datasets of two or more respective entities. The secure computation system 300 may be used for, but not limited to, sharing enterprise data from enterprise systems for enterprise benchmarking without violating the privacy of any individual contained in the datasets, such that the customers do not learn anything about the data, except the differentially private median—a meaningful value which still enjoys strong privacy guarantees. The median is a robust statistical method, as few outliers do not drastically alter the result in the same way as the mean. The median is also useful to determine if the data is skewed, such as, if outliers exist, by comparing it to the mean. Furthermore, the secure computation system 300 may be used to compute the differentially private $p^{th}$-percentile, which is the value larger than p % of the dataset (alternatively, the $k^{th}$-ranked element in the sorted data).

Two entities running one or more modules of the secure computation system 300 can execute the secure, privacy-preserving benchmarking protocol together and receive only a privacy-preserving median (or the more general $p^{th}$-percentile) of their combined data without revealing any of their own data to anybody else due to the efficient secure computation of the secure computation system 300. Furthermore, they do not require a trusted third-party server, and they can execute the protocol from their own enterprise systems and receive a result within seconds for millions of records even when there are network delays.

Use cases for the secure computation system 300 include, but are not limited to: businesses comparing typical employee salaries per department, bonus payments or sales incentives to better assess their attractiveness for the labor market, or median payments to suppliers; insurance companies using the median life expectancy of their insurees to adjust insurance premiums; and hospitals comparing mortality rates of diseases (e.g., heart attack) or per department (e.g., cardiology). Other use cases are within the scope of the present disclosure.

In some example embodiments, the secure computation system 300 is configured to determine selection probability values p(x) for each value x from the data universe (e.g., the data domain), which includes the union of two datasets of two different entities, and then determine the median of the union of the two datasets based on the selection probability values. The data universe is the set of values that can possibly be contained in a dataset. In one example showing the difference between data values and universe values, $D=\{2, 2, 6, 6, 7, 7\} \in U^6$, $U=\{1, \ldots, 10\}$, where D is a dataset with six values from its data universe U, which is all integers from 1 to 10. FIG. 4 illustrates a graph 400 of selection probability values plotted against different values of a dataset, in accordance with some example embodiments. In the example shown in FIG. 4, the secure computation system 300 may identify the median of the union of the two datasets as the value x having the highest selection probability, which is indicated by point 410 in FIG. 4.

In some example embodiments, the secure computation system 300 needs to use the respective data of the two datasets in some way in order to determine the median of two datasets. In order to protect the datasets, the secure computation system 300 may use differential privacy. The output of a differentially private algorithm, realized with the exponential mechanism, is exponentially more likely to be close to the desired result, while still preserving privacy of input values. Differential privacy is a privacy notion that allows a system to learn statistical properties of a dataset comprised of many individuals while protecting information about any individual in the dataset. Databases D, D' are called neighbors or neighboring, denoted with D~D', when database D can be obtained from D' by adding or removing one element, i.e., D=D'∪{x} with x∈U or D=D'\{y} with y∈D'. A differentially private algorithm limits the impact that the presence or absence of any individual's data in the input database can have on the distribution of outputs. In a definition of differential privacy, a mechanism M satisfies ∈-differential privacy, where ∈≥0, if for all neighboring databases D and D', and all sets S⊆Range(M)

$$Pr[M(D) \in S] \exp(\in) \cdot Pr[M(D') \in S],$$

where Range(M) denotes the set of all possible outputs of mechanism M.

The exponential mechanism selects a result from a fixed set of arbitrary outputs (e.g., by computing selection probabilities for each output), while satisfying differential privacy. The mechanism is exponentially more likely to select results that are close to the desired result (e.g., median). In some example embodiments, the mechanism is exponentially more likely to select "good" results where "good" is quantified via a utility function u(D, o), which takes as input a database D from the set of all possible databases D, and a potential output o∈O. The utility function provides a utility score for o with respect to D and all possible output values from O. A higher score means the output is more desirable and its selection probability is increased accordingly. In some example embodiments, for any utility function u:(D× O)→ℝ and a privacy parameter ε, the exponential mechanism $M_u^\varepsilon(D)$ outputs o∈O with probability proportional to $$\exp\left(\frac{\varepsilon u(D, o)}{2\Delta u}\right),$$

where $$\Delta u = \max_{\forall o \in O, D \sim D'} |u(D, o) - u(D', o)|$$

is the sensitivity of the utility function. That is, $$Pr[M_u^\varepsilon(D) = o] = \frac{\exp\left(\frac{\varepsilon u(D, o)}{2\Delta u}\right)}{\sum_{o' \in O} \exp\left(\frac{\varepsilon u(D, o')}{2\Delta u}\right)}.$$

In some example embodiments, for the median, we have O=U, which means every universe element has to be considered as a potential output.

A trusted third party, called a curator in differential privacy, may implement differentially private algorithms using a trusted server protocol. However, this trusted party requires full access to the unprotected, sensitive data.

Figure 5A:
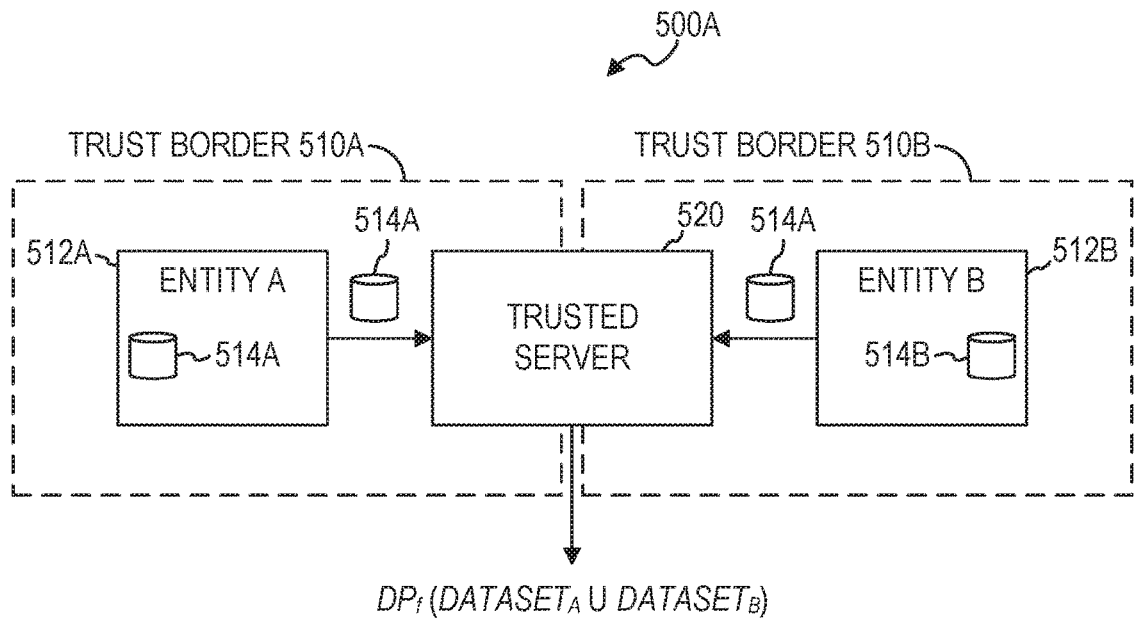
FIG. 5A illustrates a trusted server protocol for performing a secure computation over a union of two or more large confidential datasets, in accordance with some example embodiments.

FIG. 5A illustrates a trusted server protocol 500A for performing a secure computation over a union of two or more large confidential datasets, in accordance with some example embodiments. In FIG. 5A, a first entity (A) 512A and a second entity (B) 512B have their own respective datasets 514A and 514B stored on their own respective computer systems. In the trusted server protocol 500A, the respective trust borders 510A and 510B of entities 512A and 512B extend to a third-party trusted server 520 such that the third-party trusted server 520 has access to the respective datasets 514A and 514B of the entities 512A and 512B. The third-party trusted server 520 combines the datasets 514A and 514B, such as via a union operation, and computes values for an arbitrary function over the union as follows: $DP_f(DATASET_A \cup DATASET_B)$. However, since the third-party trusted server 520 in the trusted server protocol 500A requires full access to the unprotected, sensitive data of each entity 512A and 512B, this solution suffers from data security issues.

Figure 5B:
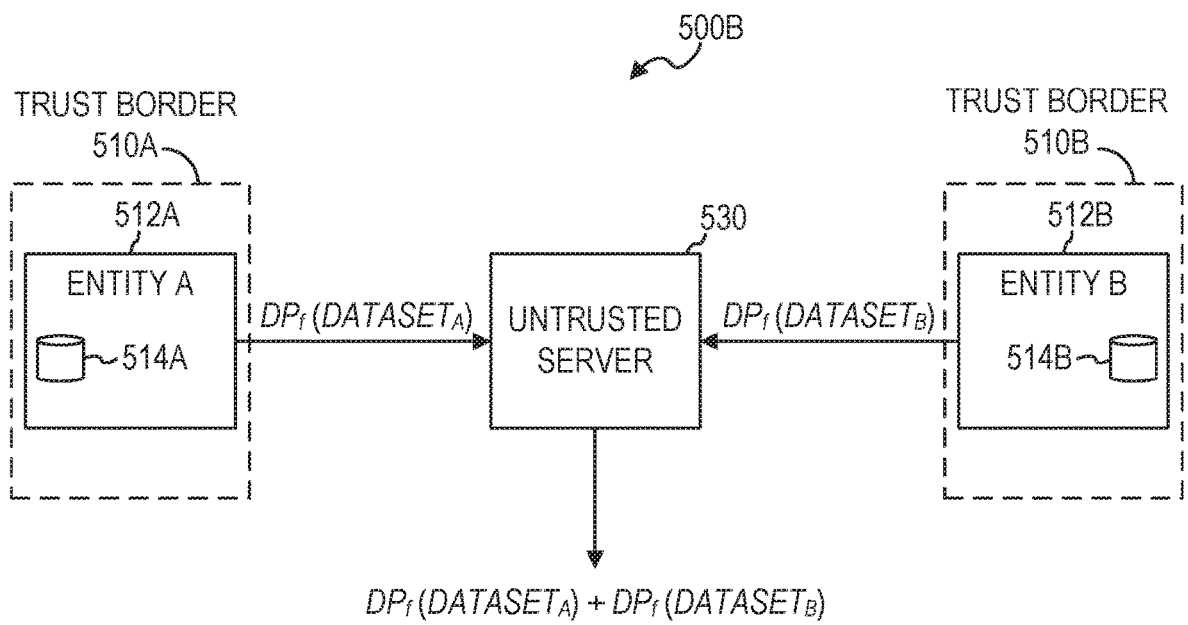
FIG. 5B illustrates an untrusted server protocol for performing a secure computation over a union of two or more large confidential datasets, in accordance with some example embodiments.

FIG. 5B illustrates an untrusted server protocol 500B for performing a secure computation over a union of two or more large confidential datasets, in accordance with some example embodiments. In the untrusted server protocol 500B, the respective trust borders 510A and 510B of entities 512A and 512B do not extend to a third-party untrusted server 530, thereby resulting in the third-part untrusted server 530 not having access to the respective datasets 514A and 514B of the entities 512A and 512B. Therefore, the first entity 512A and the second entity 512B each compute values for an arbitrary function over their own respective datasets 514A and 514B as follows: $DP_f(DATASET_A)$ and $DP_f(DATASET_B)$. In the untrusted server protocol 500B of FIG. 5B, the entities 512A and 512B locally anonymize their data, and then they combine these locally anonymized values.

The untrusted server protocol 500B provides more privacy (e.g., no curator sees the plaintext data) than the trusted server protocol 500A. However, in the untrusted server protocol 500B, the randomization happens twice—both entities compute the function values over a part of the data, their respective datasets, thereby reducing the overall accuracy, whereas with the trusted server protocol 500A, the randomization happens only once, resulting in higher accuracy. In some example embodiments, the secure computation system 300 combines the advantages of both protocols 500A and 500B by simulating the trusted server protocol 500A in the untrusted server protocol 500B. The entities use cryptographic techniques (e.g., secret sharing, garbled circuits) to compute the differentially private median, without revealing their sensitive data to a trusted third party or each other. The secure computation system 300 achieves both the improved accuracy of the trusted server protocol 500A and the increased privacy of the untrusted server protocol 500B, the local model (more privacy) by combining both protocols using cryptographic techniques.

To protect the privacy of the entities 512A and 512B without relying on a trusted third-party server 520, in some example embodiments, the secure computation system 300 uses secure computation, where the entities 512A and 512B run a protocol to compute a function on their respective input datasets 514A and 514B such that nothing about their datasets 514A and 514B is revealed except the function result, such as by using the untrusted server protocol 500B. The function may compute the differentially private median of the two datasets 514A and 514B.

General techniques that combine secure computation and differential privacy suffer from bandwidth and liveness constraints that render them impractical for large datasets. In particular, the exponential mechanism used to select a specific value, such as the median from a data universe U, has a computation complexity linear in the size of the entire data universe and efficiently sampling it is non-trivial. Furthermore, the exponential mechanism requires exponentiations and divisions, which increase the secure computation complexity.

The secure computation system 300 provides an efficient algorithm to securely compute the differentially private median of the union of two potentially large, confidential datasets with computation complexity sublinear in the size of the data universe U. In some example embodiments, the two entities prune their own datasets in a way that maintains their median. Then, they sort and merge the pruned datasets. The sorted data is used to compute selection probabilities for the entire data universe. Finally, the probabilities are used to select the differentially private median.

In some example embodiments, in order to optimize the runtime, the secure computation system 300 uses dynamic programming for the probability computation with a static, data-independent, access pattern, achieving low complexity of the secure computation circuit. The secure computation system 300 may utilize different cryptographic schemes, such as garbled circuits and secret sharing, to combine the respective comparisons and arithmetic computations of the entities. The secure computation system 300 simplifies the probability and sampling computations such that direct access to the data, and therefore the need for secure computation, is minimized. In some example embodiments, the secure computation system 300 computes the required exponentiations for the exponential mechanism without any secure computation.

The technical benefits of the algorithm of the secure computation system 300 that combines secure computation and differential privacy include, but are not limited to, selection of the differentially private median of the union of two distributed datasets without revealing anything else about the data, an improved runtime complexity sublinear in the size of the date universe achieved by utility-preserving input pruning and data-independent dynamic programming, and a comprehensive evaluation with a large real-world dataset with a practical runtime of less than 5 seconds for millions of records even with large network delay of 80 ms. The algorithm of the secure computation system 300 may be adapted to securely compute the differentially private $p^{th}$-percentile (e.g., the value larger than p % of the data).

In some example embodiments, the secure computation system 300 models a database D as a bag with underlying set 1, which is the data universe assumed to be an integer range ($U=\{x\in \mathbb{Z} \mid a\le x\le b\}$ with $a,b\in \mathbb{Z}$). Rational numbers can be expressed as integers via fixed-point number representation. D may denote the set of all possible databases (e.g., bags over U). |D| denotes the size of D and D[i] denotes the element at position $i\in I_D$ in D where $I_D=\{0,\ldots,|D|-1\}$ is the set of indices for D. We refer to non-distinct data elements, e.g., D[i]=D[j] with $i\ne j (i,j\in I_D)$, as duplicates. We apply union under bag semantics, e.g., $D_A \cup D_B$ is a bag containing elements from U as often as they appear in $D_A$ and $D_B$ combined. We treat the difference of two bags, $D_A \setminus D_B$, as a set containing only elements from $D_A$ that are not also in $D_B$. The terms database and dataset are used interchangeably within the present disclosure.

In some example embodiments, the secure computation system 300 implements an algorithm for two entities A, B with private datasets $D_A$, $D_B$ to securely and efficiently compute the differentially private median $\hat{m}$ of $D=D_A \cup D_B$. The algorithm is a secure computation of the exponential mechanism to select $\hat{m}$ from the entire data universe U. There are two challenges for secure computation of the exponential mechanism: the runtime complexity is linear in the size of the data universe, |U|, as selection probabilities for all possible outputs in U are computed; and the general exponential mechanism is too inefficient for general secure computation as it requires |U| exponentiations and divisions. The secure computation system 300 avoids these problems using the features disclosed herein.

In some example embodiments, for dataset D with universe U, the secure computation system 300 computes the median selection probability for all of U using only D and utilizing dynamic programming. The secure computation system 300 may then use the probabilities to sample the differentially private median. To compute the probabilities, the secure computation system 300 may use a simplified utility function utility, which returns non-optimal utility scores in the presence of duplicates, and then use gap values to remove non-optimal utility scores. The median selection probabilities, denoted as weight, may be computed based on their utility.

In some example embodiments, the sum of these probabilities is the basis for the cumulative distribution function, which is denoted as mass. The secure computation system 300 may select the differentially private median with inverse transform sampling based on mass. Inverse transform sampling uses the uniform distribution to realize any other distribution based on its cumulative distribution function.

In some example embodiments, the secure computation system 300 implements gap, utility, and weight such that direct access to the data D, and therefore the need for secure computation, is minimized. Each entity can compute utility and weight without any access to D. Furthermore, gap has a static access pattern, independent of the elements in (sorted) D, which makes the gap function data-oblivious, e.g., an attacker who sees the access pattern cannot learn anything about D.

The secure computation system 300 may perform four different algorithms to compute the differentially private median $\hat{m}$ of $D=D_A \cup D_B$. The four different algorithms may include a pruning algorithm, a merge and share algorithm, a selection probability algorithm, and a median selection algorithm.

In some example embodiments, the pruning module 310 performs the pruning algorithm in which both entities prune their datasets $D_A$, $D_B$ to $D_A^S$, $D_B^S$ using secure comparison realized with garbled circuits. FIG. 6 illustrates a pruning algorithm 600, in accordance with some example embodiments. In some example embodiments where D is a dataset with data universe U, $\varepsilon>0$, and $0<\alpha<1$, the upper bound for pruning steps s fulfilling $p_R \ge \alpha$ is $$\left\lfloor \log_2(\varepsilon|D|) - \log_2\left(\log_e\left(\frac{\alpha}{1-\alpha}(|U|-1)\right)\right) - 1 \right\rfloor,$$

where R is the set of remaining elements after pruning, P is the set of pruned elements, and accuracy is defined as the selection probability mass of the non-pruned (e.g., the remaining) elements:

$$p_R = 1 - p_P = \sum_{x \in R} Pr[M_u^\epsilon(D^s) = x],$$

with $u=u_{median}$. With $0.5<p_R\leq 1$, it is more likely to select the differentially private median among R than among P. The number of pruning steps s enables a tradeoff between accuracy $p_R$ and computation complexity: smaller s means higher $p_R$ and larger s means smaller input size $|D^s|$ for the secure computation. In some example embodiments, the number of pruning steps s is maximized such that it is more likely to select an element from R instead of from P.

In some example embodiments, the merging module 320 is configured to perform the merge and share algorithm in which, together, the entities merge their pruned data $D_A^S$, $D_B^S$ into the sorted $D^S$ via bitonic mergers implemented with garbled circuits. $D^S$ is secret shared between A,B (e.g., A holds shares $\langle D^S[i]\rangle$, B holds shares $\langle D^S[i]\rangle$ for all $i \in I_{D^s}$). FIG. 7 illustrates a merge and share algorithm 700 configured to generate secret shares of a sorted union of data, in accordance with some example embodiments.

In some example embodiments, the computation module 330 is configured to perform the selection probability algorithm in which the entities compute utility, weight, and gap, the latter via secret shares from the merge and share algorithm, to produce shares of mass resulting in each entity $P \in \{A,B\}$ holding shares $\langle D^S[i]\rangle$, $\langle gap[i]\rangle_P$, and $\langle mass(i)_P\rangle$ for all $i \in I_{D^s}$. FIG. 8 illustrates a selection probability algorithm 800 configured to compute secret shares of gap values and secret shares of probability mass values, in accordance with some example embodiments.

In some example embodiments, the selection module 340 is configured to perform the median selection algorithm in which the entities securely reconstruct all shares and select the differentially private median via inverse transform sampling realized with garbled circuits. First, they may sample $D^S[j] \in D^S$ based on mass. Then, they may select the differentially private median that uniform random among the gap(j) consecutive elements with the same utility as $D^S[j]$. FIG. 9 illustrates a median selection algorithm 900 configured to determine a median of a union of two or more datasets using an inverse transform sampling algorithm, in accordance with some example embodiments.

In the algorithms 600, 700, 800, and 900, the notation "A:" at the beginning of an algorithm operation indicates that only entity A performs the following operation, and likewise for entity B. In some example embodiments, each entity comprises one or more of the modules 310, 320, 330, and 340, such that entity A and entity B may each perform the algorithms 600, 700, 800, and 900 or any of the operations thereof. Furthermore, an untrusted third-party server may also comprise one or more of the modules 310, 320, 330, and 340, such that the untrusted third-party server may perform the algorithms 600, 700, 800, and 900 or any of the operations thereof.

Figure 10:
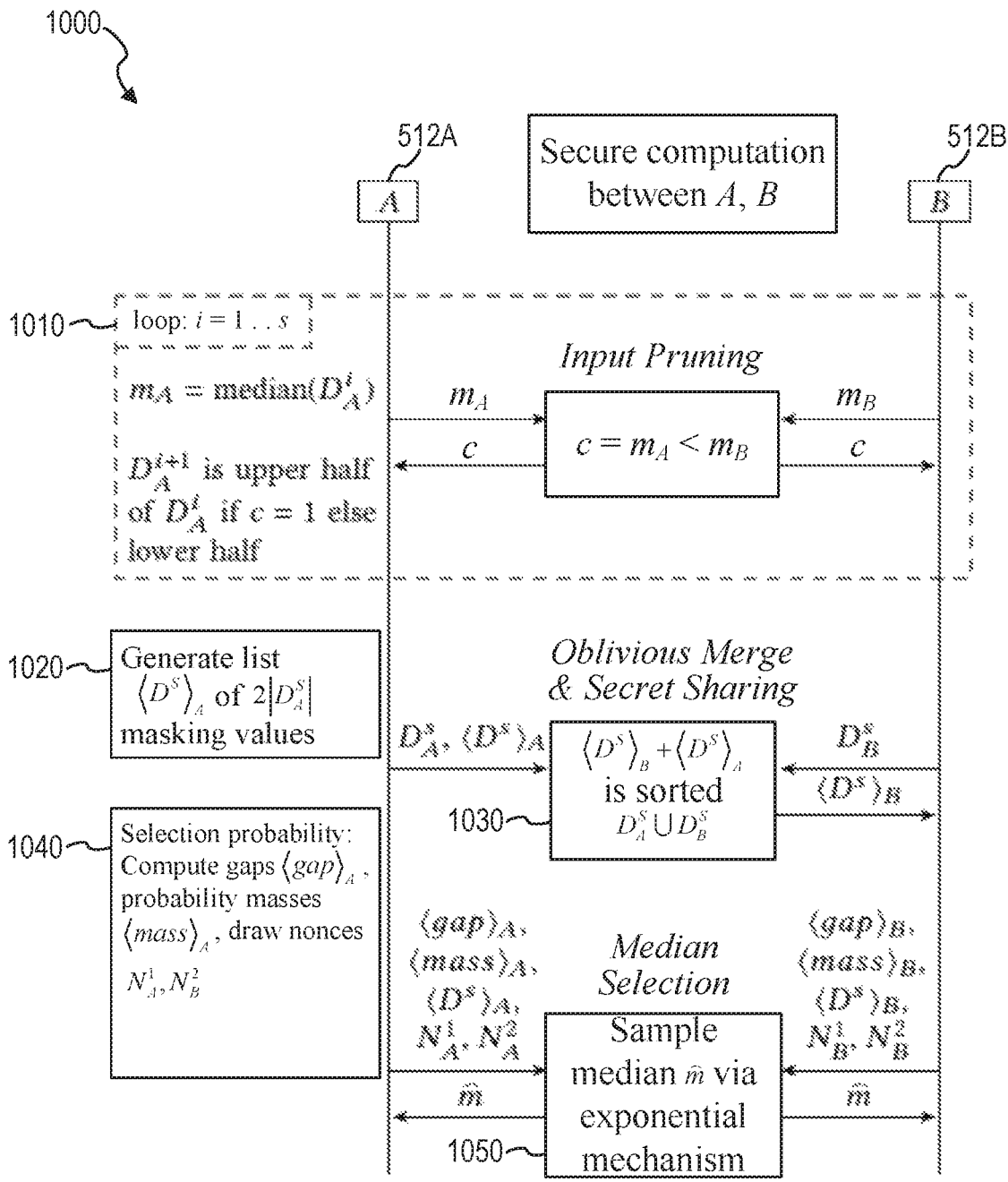
FIG. 10 is a sequence diagram illustrating a method of efficient and secure computation of a differentially private median of the union of two or more large confidential datasets, in accordance with some example embodiments.

FIG. 10 is a sequence diagram 1000 illustrating a method of efficient and secure computation of a differentially private median of the union of two or more large confidential datasets, in accordance with some example embodiments. At operation 1010, the secure computation system 300 performs the pruning algorithm 600 of FIG. 6. At operation 1020, the secure computation system 300 generates list $\langle D^S\rangle_A$ of $2|D_A^S|$ masking values. At operation 1030, the secure computation system 300 performs the merge and share algorithm 700 of FIG. 7. At operation 1040, the secure computation system 300 performs the selection probability algorithm 800 of FIG. 8. At operation 1050, the secure computation system 300 performs the median selection algorithm 900 of FIG. 9.

In some example embodiments, the computation module 330 is configured to compute different values that are used to determine the median of the union of datasets, such as utility, gap, weight, and mass. The computation module 330 may use the following median utility function that scores the utility of an element of D at position $i \in I_D$ as:

$$\text{utility}(i) = \begin{cases} i - \frac{|D|}{2} + 1 & \text{if } i < \frac{|D|}{2} - 1 \\ \frac{|D|}{2} - i & \text{else} \end{cases}.$$

The computation module 330 may use the following gap function that gives the number of elements in sorted D in the half-open range [D[i], D[i+1]) or (D[i−1], D[i]] depending on $i \in I_D$ as:

$$\text{gap}(i) = \begin{cases} D[i+1] - D[i] & \text{if } i < \frac{|D|}{2} - 1 \\ 1 & \text{if } i = \frac{|D|}{2} - 1 \\ D[i] - D[i-1] & \text{else} \end{cases}.$$

The computation module 330 may use the following weight function to generate the (unnormalized) selection probability for an element at index $i \in I_D$ as:

weight($i$)=exp($\epsilon \cdot$utility($i$)), where $\epsilon$ is a privacy parameter.

The secure computation system 300 may use the weight and gap to define the probability sum of elements with the same utility, which is referred to as mass. The secure computation system 300 may use the following probability mass function:

$$\text{mass}(i) = \sum_{h=0}^{i} \text{weight}(h) \cdot \text{gap}(h).$$

FIG. 11 illustrates a table 1100 showing examples of utility values and gap values, in accordance with some example embodiments. Table 1100 shows $u_{median}$ compared with utility with static access pattern and gap for sorted $D=\{2,2,6,6,7,7\} \in U^6$, $U=\{1, \ldots, 10\}$. To cover utility for all of U, min(U), max(U) are added to D. Table 1100 illustrates that utility for sorted D is just a sequence that first increases, then decreases after the median. Min(U) is added to the beginning and max(o) is added to the end of D, which is highlighted in the bold column labeled min(U), max(U) in table 1100. The utility for "missing elements" in U\D, highlighted in bold columns, is the same as for the preceding or succeeding element in D. Furthermore, gap is zero for the median-furthest duplicates and otherwise indicates the number of consecutive elements in U with the same utility (e.g., gap(2)=4 since elements 2, 3, 4, 5 have the same utility utility(2)=−1 as D[2]=2).

In some example embodiments, the selection module 340 is configured to determine the median using inverse transform sampling to sample the differentially private median from the distribution defined by the exponential mechanism, which is equivalent to finding index $j \in I_D$ such that mass(j−1)≤r<mass(j) for a uniform random r. Finally, the selection module 340 may select the median among the gap(j) consecutive elements with the same utility (and thus probability) as the element at index j at uniform random. Now, with the simplified utility, the selection module 340 does not need to iterate over all elements in U, but only over elements in D while still covering all elements "in between", e.g., in U\D, via gap.

Figure 12:
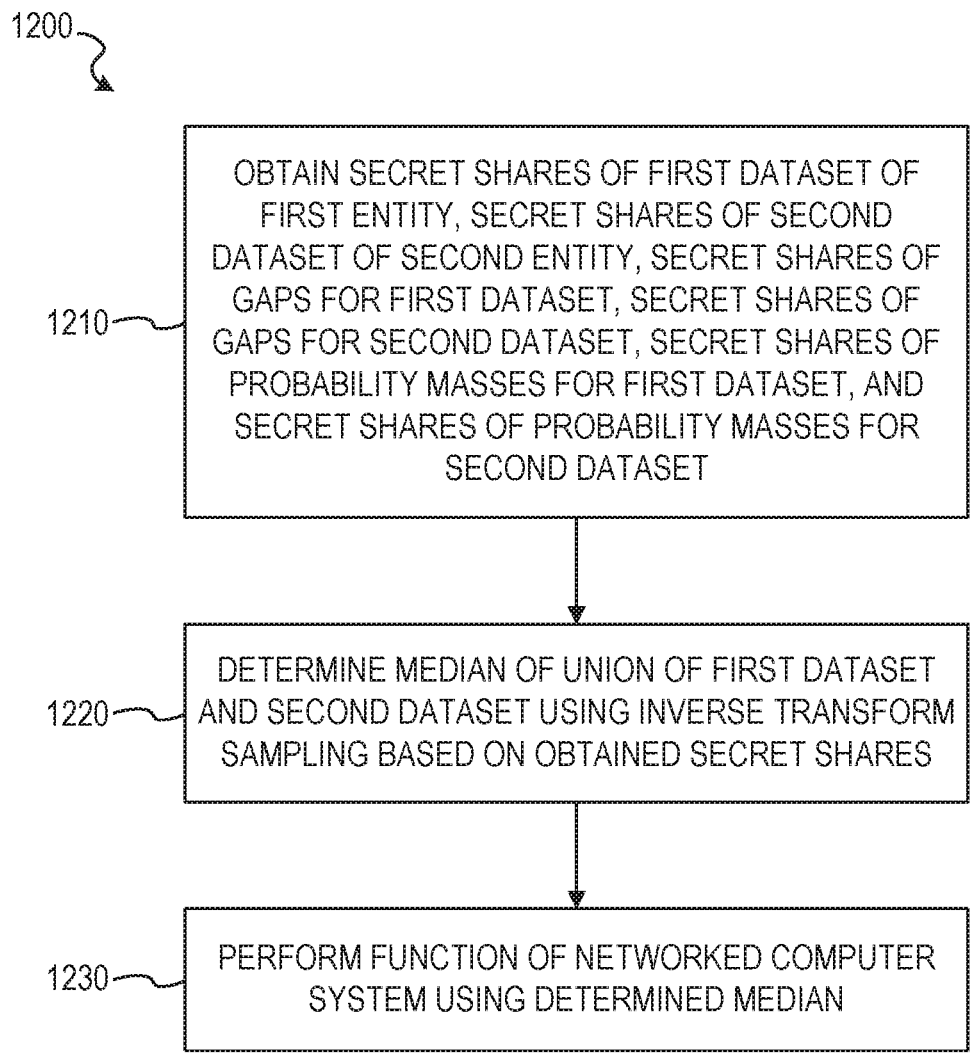
FIG. 12 is a flowchart illustrating a method of efficient and secure computation of a differentially private median of the union of two or more large confidential datasets, in accordance with some example embodiments.

FIG. 12 is a flowchart illustrating a method 1200 of efficient and secure computation of a differentially private median of the union of two or more large confidential datasets, in accordance with some example embodiments. The method 1200 can be performed by processing logic that can comprise hardware (e.g., circuitry, dedicated logic, programmable logic, microcode, etc.), software (e.g., instructions run on a processing device), or a combination thereof. In one example embodiment, the method 1200 is performed by the secure computation system of FIG. 3, or any combination of one or more of its modules 310, 320, 330, and 340, as described above.

At operation 1210, the secure computation system 300 obtains secret shares of a first dataset of a first entity, secret shares of a second dataset of a second entity, secret shares of gap values for the first dataset, secret shares of gap values for the second dataset, secret shares of probability mass values for the first dataset, and secret shares of probability mass values for the second dataset. In some example embodiments, the obtaining of the secret shares comprises generating secret shares of a union of at least a portion of the first dataset and at least a portion of the second dataset using a bitonic merging algorithm, and then computing the secret shares of the first dataset, the secret shares of the second dataset, the secret shares of the gap values for the first dataset, the secret shares of the gap values for the second dataset, the secret shares of the probability mass values for the first dataset, and the secret shares of probability mass values for the second dataset using the secret shares of the union. In some example embodiments, the generating the secret shares of the union is performed using a garbled circuit protocol. In some example embodiments, the obtaining of the secret shares further comprises generating the at least a portion of the first dataset using a pruning algorithm, where the pruning algorithm is configured to determine whether a median value of the first dataset is less than a median value of the second dataset, prune the lower half of the first dataset to generate the at least a portion of the first dataset as being absent the lower half in response to a determination that the median value of the first dataset is less than the median value of the second dataset, and prune the upper half of the first dataset to generate the at least a portion of the first dataset as being absent the upper half in response to a determination that the median value of the first dataset is not less than the median value of the second dataset. In some example embodiments, the generating the at least a portion of the first dataset or the at least a portion of the second dataset is performed using a garbled circuit protocol.

At operation 1220, the secure computation system 300 determines a median of a union of the first dataset and the second dataset using an inverse transform sampling algorithm based on the secret shares of the first dataset, the secret shares of the second dataset, the secret shares of the gap values for the first dataset, the secret shares of the gap values for the second dataset, the secret shares of the probability mass values for the first dataset, and the secret shares of the probability mass values for the second dataset. In some example embodiments, the determining of the median is performed using a garbled circuit protocol.

At operation 1230, the secure computation system 300 performs a function of a networked computer system using the determined median. In some example embodiments, the function of the networked computer system comprises causing the determined median to be displayed on a computing device. However, other functions are also within the scope of the present disclosure.

It is contemplated that any of the other features described within the present disclosure can be incorporated into the method 1200.

Figure 13:
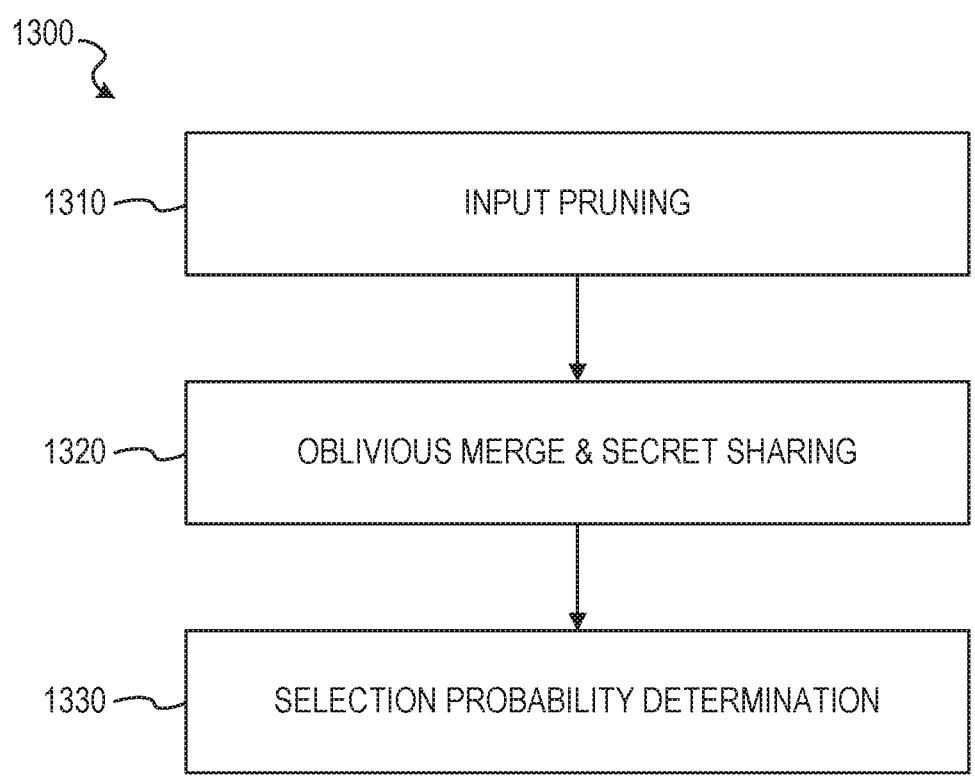
FIG. 13 is a flowchart illustrating a method of obtaining secret shares of values that are used to determine a median of a union of two or more large confidential datasets, in accordance with some example embodiments.
Figure 14:
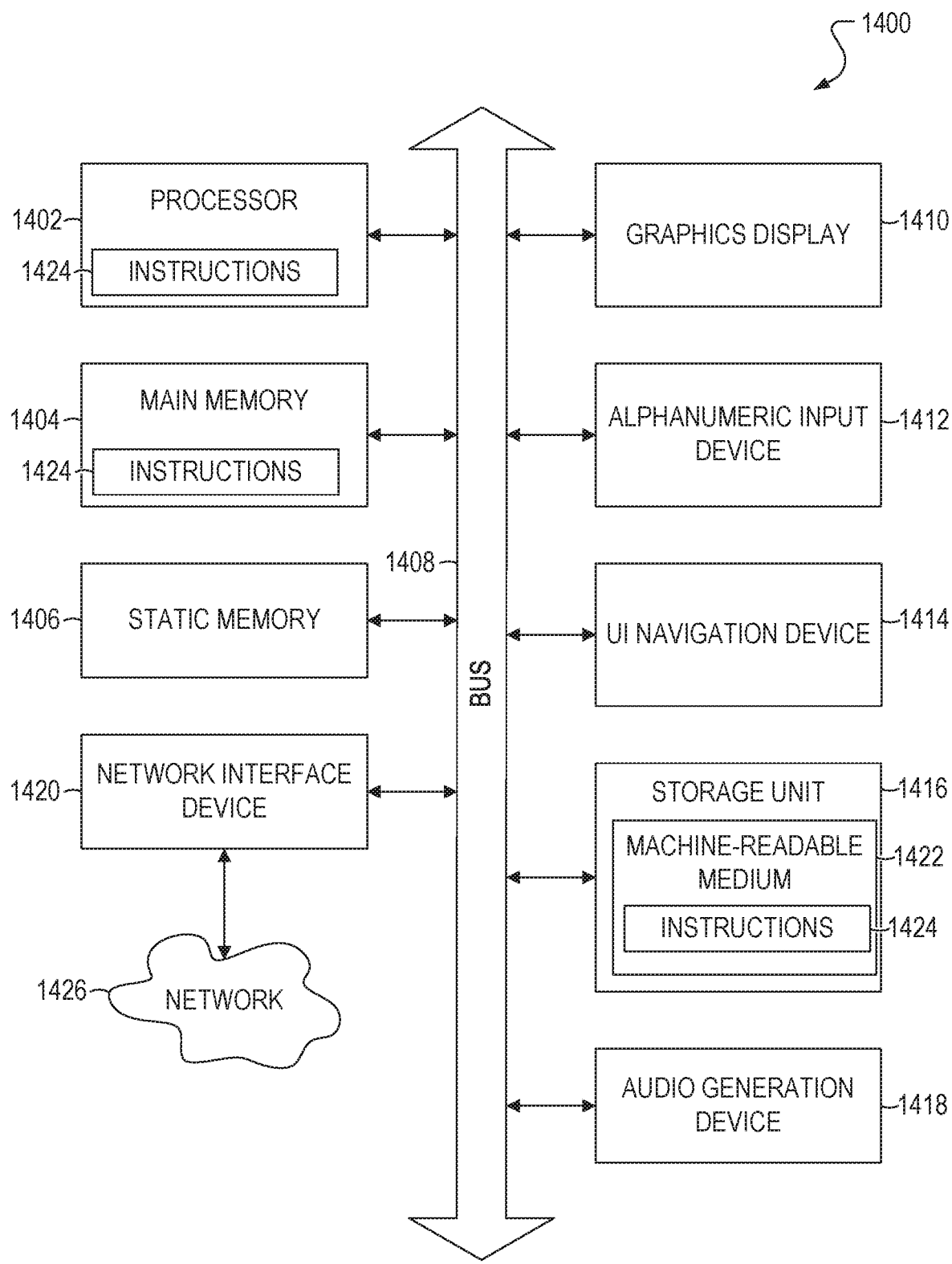
FIG. 14 is a block diagram of an example computer system on which methodologies described herein can be executed, in accordance with some example embodiments.

FIG. 13 is a flowchart illustrating a method 1300 of obtaining secret shares of values that are used to determine a median of a union of two or more large confidential datasets, in accordance with some example embodiments. For example, the method 1300 may be performed as part of operation 1210 of the method 1200 of FIG. 12. The method 1300 can be performed by processing logic that can comprise hardware (e.g., circuitry, dedicated logic, programmable logic, microcode, etc.), software (e.g., instructions run on a processing device), or a combination thereof. In one example embodiment, the method 1300 is performed by the secure computation system of FIG. 3, or any combination of one or more of its modules 310, 320, 330, and 340, as described above.

At operation 1310, the secure computation system 300 performs an input pruning algorithm on two or more datasets. In some example embodiments, the secure computation system 300 performs the pruning algorithm 800 of FIG. 8. For example, the secure computation system 300 may determine whether a median value of a first dataset is less than a median value of a second dataset. If it is determined by the secure computation system 300 that the median value of the first dataset is less than the median value of the second dataset, then the secure computation system 300 may prune the lower half of the first dataset to generate a pruned version of the first dataset having a portion of the first dataset and being absent the lower half. If it is determined by the secure computation system 300 that the median value of the first dataset is not less than the median value of the second dataset, then the secure computation system 300 may prune the upper half of the first dataset to generate a pruned version of the first dataset having a portion of the first dataset and being absent the upper half. The secure computation system 300 may perform this pruning algorithm for each dataset (e.g., the first dataset of the first entity, the second dataset of the second entity). In some example embodiments, the secure computation system 300 uses a garbled circuit protocol to generate the pruned versions of the datasets.

At operation 1320, the secure computation system 300 performs a merge and share algorithm on the pruned versions of the two or more datasets. In some example embodiments, the secure computation system 300 performs the merge and share algorithm 700 of FIG. 7. For example, the secure computation system 300 may generate secret shares of a sorted union of at least a portion of the first dataset and at least a portion of the second dataset using a bitonic merging algorithm. In some example embodiments, the generating of the secret shares of the union is performed using a garbled circuit protocol.

At operation 1330, the secure computation system 300 performs a selection probability algorithm. In some example embodiments, the secure computation system 300 performs the selection probability algorithm 800 of FIG. 8. For example, the secure computation system 300 may compute the secret shares of the first dataset, the secret shares of the second dataset, the secret shares of the gap values for the first dataset, the secret shares of the gap values for the second dataset, the secret shares of the probability mass values for the first dataset, and the secret shares of probability mass values for the second dataset using the secret shares of the union generated at operation 1320.

It is contemplated that any of the other features described within the present disclosure can be incorporated into the method 1300.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

FIG. 8 is a block diagram of a machine in the example form of a computer system 800 within which instructions 824 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804, and a static memory 806, which communicate with each other via a bus 808. The computer system 800 may further include a graphics or video display unit 810 (e.g., a liquid crystal display (LCD) or a cathode ray tube (CRT)). The computer system 800 also includes an alphanumeric input device 812 (e.g., a keyboard), a user interface (UI) navigation (or cursor control) device 814 (e.g., a mouse), a storage unit (e.g., a disk drive unit) 816, an audio or signal generation device 818 (e.g., a speaker), and a network interface device 820.

The storage unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media. The instructions 824 may also reside, completely or at least partially, within the static memory 806.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Each of the features and teachings disclosed herein can be utilized separately or in conjunction with other features and teachings to provide a system and method for blind spot implementation in neural networks. Representative examples utilizing many of these additional features and teachings, both separately and in combination, are described in further detail with reference to the attached figures. This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the method steps disclosed herein. The structure for a variety of these systems will appear from the description herein. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to aid in understanding how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

EXAMPLES

1. A computer-implemented method comprising:
   obtaining, by at least one hardware processor, secret shares of a first dataset of a first entity, secret shares of a second dataset of a second entity, secret shares of gap values for the first dataset, secret shares of gap values for the second dataset, secret shares of probability mass values for the first dataset, and secret shares of probability mass values for the second dataset;
   determining, by the at least one hardware processor, a differentially private median of a union of the first dataset and the second dataset using an inverse transform sampling algorithm based on the secret shares of the first dataset, the secret shares of the second dataset, the secret shares of the gap values for the first dataset, the secret shares of the gap values for the second dataset, the secret shares of the probability mass values for the first dataset, and the secret shares of the probability mass values for the second dataset; and
   performing, by the at least one hardware processor, a function of a networked computer system using the determined median.
2. The computer-implemented method of example 1, wherein the function of the networked computer system comprises causing the determined median to be displayed on a computing device.
3. The computer-implemented method of example 1 or example 2, wherein the determining the median is performed using a garbled circuit protocol.
4. The computer-implemented method of any one of examples 1 to 3, wherein the obtaining comprises:
   generating secret shares of a sorted union of at least a portion of the first dataset and at least a portion of the second dataset using a bitonic merging algorithm; and
   computing the secret shares of the first dataset, the secret shares of the second dataset, the secret shares of the gap values for the first dataset, the secret shares of the gap values for the second dataset, the secret shares of the probability mass values for the first dataset, and the secret shares of probability mass values for the second dataset using the secret shares of the sorted union.
5. The computer-implemented method of example 4, wherein the generating the secret shares of the union is performed using a garbled circuit protocol.
6. The computer-implemented method of example 4 or example 5, wherein the obtaining further comprises generating the at least a portion of the first dataset using a pruning algorithm, the pruning algorithm being configured to, for multiple iterations:

determine whether a median value of the first dataset is less than a median value of the second dataset;

if the median value of the first dataset is less than the median value of the second dataset, then prune the lower half of the first dataset to generate the at least a portion of the first dataset as being absent the lower half; and if the median value of the first dataset is not less than the median value of the second dataset, then prune the upper half of the first dataset to generate the at least a portion of the first dataset as being absent the upper half.

7. The computer-implemented method of example 6, wherein the generating the at least a portion of the first dataset or the at least a portion of the second dataset is performed using a garbled circuit protocol.

8. A system comprising:
   at least one processor; and
   a non-transitory computer-readable medium storing executable instructions that, when executed, cause the at least one processor to perform the method of any one of examples 1 to 7.

9. A non-transitory machine-readable storage medium, tangibly embodying a set of instructions that, when executed by at least one processor, causes the at least one processor to perform the method of any one of examples 1 to 7.

10. A machine-readable medium carrying a set of instructions that, when executed by at least one processor, causes the at least one processor to carry out the method of any one of examples 1 to 7.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
   obtaining, by at least one hardware processor, secret shares of a first dataset of a first entity, secret shares of a second dataset of a second entity, secret shares of gap values for the first dataset, secret shares of gap values for the second dataset, secret shares of probability mass values for the first dataset, and secret shares of probability mass values for the second dataset, the gap values for the first dataset comprising differences between adjacent data points in the first dataset, and the gap values for the second dataset comprising difference between adjacent data points in the second dataset;
   determining, by the at least one hardware processor, a differentially private median of a union of the first dataset and the second dataset using an inverse transform sampling algorithm based on the secret shares of the first dataset, the secret shares of the second dataset, the secret shares of the gap values for the first dataset, the secret shares of the gap values for the second dataset, the secret shares of the probability mass values for the first dataset, and the secret shares of the probability mass values for the second dataset, the determining the differentially private median being performed using a garbled circuit protocol; and
   performing, by the at least one hardware processor, a function of a networked computer system using the determined median.

2. The computer-implemented method of claim 1, wherein the function of the networked computer system comprises causing the determined median to be displayed on a computing device.

3. The computer-implemented method of claim 1, wherein the obtaining comprises:
   generating secret shares of a sorted union of at least a portion of the first dataset and at least a portion of the second dataset using a bitonic merging algorithm; and
   computing the secret shares of the first dataset, the secret shares of the second dataset, the secret shares of the gap values for the first dataset, the secret shares of the gap values for the second dataset, the secret shares of the probability mass values for the first dataset, and the secret shares of probability mass values for the second dataset using the secret shares of the sorted union.

4. The computer-implemented method of claim 3, wherein the generating the secret shares of the union is performed using a garbled circuit protocol.

5. The computer-implemented method of claim 3, wherein the obtaining further comprises generating the at least a portion of the first dataset using a pruning algorithm, the pruning algorithm being configured to, for multiple iterations:
   determine whether a median value of the first dataset is less than a median value of the second dataset;
   if the median value of the first dataset is less than the median value of the second dataset, then prune a lower half of the first dataset to generate the at least a portion of the first dataset as being absent the lower half; and
   if the median value of the first dataset is not less than the median value of the second dataset, then prune an upper half of the first dataset to generate the at least a portion of the first dataset as being absent the upper half.

6. The computer-implemented method of claim 5, wherein the generating the at least a portion of the first dataset or the at least a portion of the second dataset is performed using a garbled circuit protocol.

7. The computer-implemented method of claim 1, wherein the determining the differentially private median of the union of the first dataset and the second dataset is performed without using a trusted third-party server.

8. A system comprising:
   at least one processor; and
   a non-transitory computer-readable medium storing executable instructions that, when executed, cause the at least one processor to perform operations comprising:
      obtaining secret shares of a first dataset of a first entity, secret shares of a second dataset of a second entity, secret shares of gap values for the first dataset, secret shares of gap values for the second dataset, secret shares of probability mass values for the first dataset, and secret shares of probability mass values for the second dataset, the gap values for the first dataset comprising differences between adjacent data points in the first dataset, and the gap values for the second dataset comprising difference between adjacent data points in the second dataset;

determining a differentially private median of a union of the first dataset and the second dataset using an inverse transform sampling algorithm based on the secret shares of the first dataset, the secret shares of the second dataset, the secret shares of the gap values for the first dataset, the secret shares of the gap values for the second dataset, the secret shares of the probability mass values for the first dataset, and the secret shares of the probability mass values for the second dataset, the determining the differentially private median being performed using a garbled circuit protocol; and performing a function of a networked computer system using the determined.

9. The system of claim 8, wherein the function of the networked computer system comprises causing the determined median to be displayed on a computing device.

10. The system of claim 8, wherein the obtaining comprises:

generating secret shares of a sorted union of at least a portion of the first dataset and at least a portion of the second dataset using a bitonic merging algorithm; and computing the secret shares of the first dataset, the secret shares of the second dataset, the secret shares of the gap values for the first dataset, the secret shares of the gap values for the second dataset, the secret shares of the probability mass values for the first dataset, and the secret shares of probability mass values for the second dataset using the secret shares of the sorted union.

11. The system of claim 10, wherein the generating the secret shares of the union is performed using a garbled circuit protocol.

12. The system of claim 10, wherein the obtaining further comprises generating the at least a portion of the first dataset using a pruning algorithm, the pruning algorithm being configured to, for multiple iterations:

determine whether a median value of the first dataset is less than a median value of the second dataset;

if the median value of the first dataset is less than the median value of the second dataset, then prune a lower half of the first dataset to generate the at least a portion of the first dataset as being absent the lower half; and if the median value of the first dataset is not less than the median value of the second dataset, then prune an upper half of the first dataset to generate the at least a portion of the first dataset as being absent the upper half.

13. The system of claim 12, wherein the generating the at least a portion of the first dataset or the at least a portion of the second dataset is performed using a garbled circuit protocol.

14. The system of claim 8, wherein the determining the differentially private median of the union of the first dataset and the second dataset is performed without using a trusted third-party server.

15. A non-transitory machine-readable storage medium, tangibly embodying a set of instructions that, when executed by at least one processor, causes the at least one processor to perform operations comprising:

obtaining secret shares of a first dataset of a first entity, secret shares of a second dataset of a second entity, secret shares of gap values for the first dataset, secret shares of gap values for the second dataset, secret shares of probability mass values for the first dataset, and secret shares of probability mass values for the second dataset, the gap values for the first dataset comprising differences between adjacent data points in the first dataset, and the gap values for the second dataset comprising difference between adjacent data points in the second dataset;

determining a differentially private median of a union of the first dataset and the second dataset using an inverse transform sampling algorithm based on the secret shares of the first dataset, the secret shares of the second dataset, the secret shares of the gap values for the first dataset, the secret shares of the gap values for the second dataset, the secret shares of the probability mass values for the first dataset, and the secret shares of the probability mass values for the second dataset, the determining the differentially private median being performed using a garbled circuit protocol; and performing a function of a networked computer system using the determined median.

16. The non-transitory machine-readable storage medium of claim 15, wherein the function of the networked computer system comprises causing the determined median to be displayed on a computing device.

17. The non-transitory machine-readable storage medium of claim 15, wherein the obtaining comprises:

generating secret shares of a sorted union of at least a portion of the first dataset and at least a portion of the second dataset using a bitonic merging algorithm; and computing the secret shares of the first dataset, the secret shares of the second dataset, the secret shares of the gap values for the first dataset, the secret shares of the gap values for the second dataset, the secret shares of the probability mass values for the first dataset, and the secret shares of probability mass values for the second dataset using the secret shares of the sorted union.

18. The non-transitory machine-readable storage medium of claim 17, wherein the generating the secret shares of the union is performed using a garbled circuit protocol.

19. The non-transitory machine-readable storage medium of claim 17, wherein the obtaining further comprises generating the at least a portion of the first dataset using a pruning algorithm, the pruning algorithm being configured to, for multiple iterations:

determine whether a median value of the first dataset is less than a median value of the second dataset;

if the median value of the first dataset is less than the median value of the second dataset, then prune a lower half of the first dataset to generate the at least a portion of the first dataset as being absent the lower half; and if the median value of the first dataset is not less than the median value of the second dataset, then prune an upper half of the first dataset to generate the at least a portion of the first dataset as being absent the upper half.

20. The non-transitory machine-readable medium of claim 19, wherein the generating the at least a portion of the first dataset or the at least a portion of the second dataset is performed using a garbled circuit protocol.

* * * * *